(12) United States Patent
Michel et al.

(10) Patent No.: US 11,235,512 B2
(45) Date of Patent: Feb. 1, 2022

(54) DEVICE FOR ADDITIVELY MANUFACTURING A COMPONENT

(71) Applicant: Fraunhofer-Gesellschaft zur Förderung der angewandten Forschung e.V., Munich (DE)

(72) Inventors: Peter Michel, Hof (DE); Thomas Glässer, Hinsdorf (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 430 days.

(21) Appl. No.: 15/971,488

(22) Filed: May 4, 2018

(65) Prior Publication Data
US 2018/0250876 A1 Sep. 6, 2018

Related U.S. Application Data

(63) Continuation of application No. PCT/EP2016/077433, filed on Nov. 11, 2016.

(30) Foreign Application Priority Data

Nov. 12, 2015 (EP) .................................... 15194271

(51) Int. Cl.
*B29C 64/118* (2017.01)
*B33Y 30/00* (2015.01)
(Continued)

(52) U.S. Cl.
CPC .......... *B29C 64/118* (2017.08); *B29C 64/153* (2017.08); *B29C 64/295* (2017.08);
(Continued)

(58) Field of Classification Search
None
See application file for complete search history.

(56) References Cited

U.S. PATENT DOCUMENTS 5,049,323 A * 9/1991 Giles, Jr. ................. B29C 70/46
264/257
2009/0102083 A1* 4/2009 Cochran ................. B29C 49/78
264/40.6
(Continued)

FOREIGN PATENT DOCUMENTS

DE   102010042349 A1 * 4/2012  ........... D04H 1/4242
DE   102010053841 A1 * 6/2012  ........... B29C 70/543
(Continued)

OTHER PUBLICATIONS

Machine English Translation of DE-102010053841-A1, Accessed Jul. 29, 2020 (Year: 2010).*
(Continued)

*Primary Examiner* — Peter L Vajda
*Assistant Examiner* — Adrianna N Konves
(74) *Attorney, Agent, or Firm* — Crowell & Moring LLP

(57) ABSTRACT

A device may be provided for additively manufacturing a component, comprising at least one component holder, which is designed to hold the component to be manufactured, and comprising at least one application device, which is designed to heat a thermoplastic material and to deposit it in a predeterminable amount, wherein the device also includes at least one radiation source, which is designed to produce electromagnetic radiation, by means of which at least one partial area of the component can be heated, and the device also includes at least one supply apparatus, which is designed to introduce a fiber reinforcement into the component, which fiber reinforcement includes or consists of an endless fiber. A method for additively manufacturing a component may also be provided.

16 Claims, 3 Drawing Sheets

(51) Int. Cl.
- B33Y 10/00 (2015.01)
- B33Y 70/00 (2020.01)
- B33Y 80/00 (2015.01)
- B29C 64/153 (2017.01)
- B29C 64/295 (2017.01)
- B29C 35/08 (2006.01)

(52) U.S. Cl.
CPC ............... *B33Y 10/00* (2014.12); *B33Y 30/00* (2014.12); *B33Y 70/00* (2014.12); *B33Y 80/00* (2014.12); *B29C 35/0805* (2013.01); *B29C 2035/0822* (2013.01); *B29C 2035/0838* (2013.01)

(56) References Cited

U.S. PATENT DOCUMENTS

| | | |
|---|---|---|
| 2015/0290875 A1 | 10/2015 | Mark et al. |
| 2015/0314528 A1 | 11/2015 | Gordon |

FOREIGN PATENT DOCUMENTS

| | | |
|---|---|---|
| WO | WO 2015/107309 | 7/2015 |
| WO | WO 2014/193505 | 12/2015 |

OTHER PUBLICATIONS

Machine English Translation of DE-102010042349-A1, Accessed Jul. 29, 2020 (Year: 2010).*

International Search Report, issued in International Application No. PCT/EP2016/077433, dated Feb. 14, 2017, pp. 1-3, European Patent Office, Rijswijk, The Netherlands.

Daniel K. Schneider, "Post processing of 3D polymer prints," dated 2016, pp. 1-14, published online by EduTech Wiki.

Jeff Sloan, "I want to say two words to you: 'Thermoplastic tapes,'" dated Jan. 29, 2018, pp. 1-14, Carbon Fiber 2019 Presenter, published online by CompositesWorld at URL https://www.compositesworld.com/articles/i-want-to-say-two-words-to-you-thermoplastic-tapes.

"Markforged Mark One—carbon parts from the 3D printer" dated Jan. 31, 2014, pp. 1-5, published online by Filamentworld at www.filamentworld.de (machine translation provided).

\* cited by examiner

DEVICE FOR ADDITIVELY MANUFACTURING A COMPONENT

CROSS-REFERENCE TO RELATED APPLICATIONS

This application is a continuation of international patent application PCT/EP2016/077433 filed Nov. 11, 2016, which claims priority under 35 USC § 119 to European patent application EP 15194271.1 filed Nov. 12, 2015. The entire contents of each of the above-identified applications are hereby incorporated by reference.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
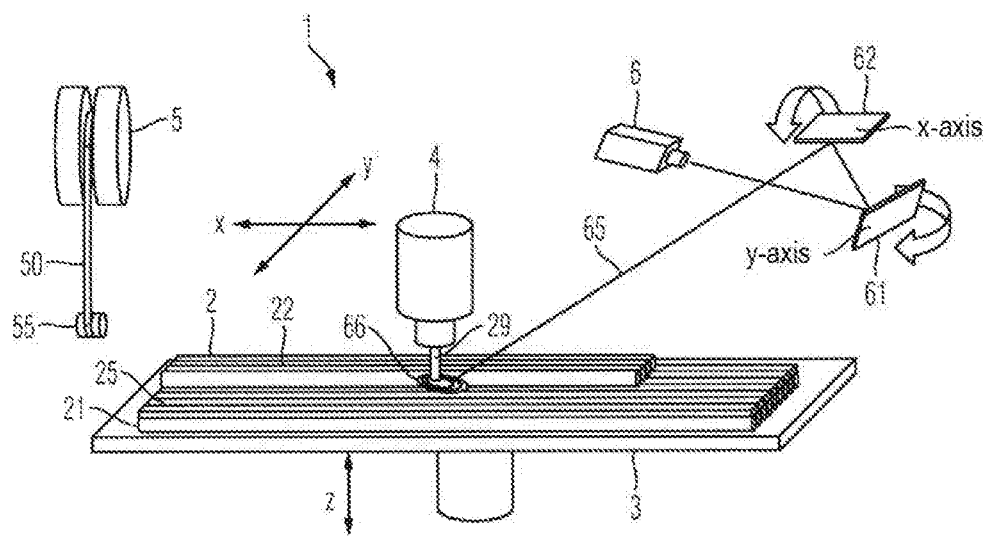
FIG. 1 shows a device according to the present invention when the thermoplastic material is deposited.

The invention relates to a device for additively manufacturing a component, comprising at least one component holder, which is designed to hold the component to be manufactured, and comprising at least one application device, which is designed to heat a thermoplastic material and to deposit it in a predeterminable amount. The invention also relates to a method for additively manufacturing a component, in which at least one heated thermoplastic material is deposited in predeterminable surface areas of the component and solidified by cooling. Methods of the above mentioned type are common in particular in the field of rapid prototyping.

A generative and/or additive manufacturing method is known from practice, by means of which a workpiece is built layer by layer from a meltable plastic material. In this process, a matrix of dots or strands is applied to a surface, wherein each strand and/or dot is produced by liquefying a strand-like plastic material made of a thermoplastic. The liquefied thermoplastic is deposited by means of extrusion using a nozzle on a predeterminable location of the workpiece and then solidified at the desired location by cooling. A complex body is built up by moving across a working plane line-by-line and depositing a further working plane thereon. The desired form is thus built layer by layer. By these methods, it is possible to produce hollow bodies and solid bodies. These known manufacturing methods are known under the name of fused deposition modeling, fused layering or fused filament fabrication.

These known manufacturing methods have the drawback that the strand-by-strand buildup results in a highly inhomogeneous thermal load profile. It is produced since the molten plastic material of the respectively manufactured working plane is deposited in each case on already solidified material of the preceding working plane. This leads to an insufficient homogeneity of the component on the boundary surfaces between individual working planes. This creates material defects which can cause an early failure of the component, in particular in the case of high dynamic loads.

Furthermore, many plastic components need a fiber reinforcement to be able to receive the loads intended for them throughout their service life. However, high fiber volume fractions cannot be obtained with known methods.

Finally, plastic components which were produced by the known method have a poor surface quality with a high roughness since a ribbed or corrugated surface structure remains visible when the dot-by-dot or strand-by-strand deposition of the thermoplastic material is used.

All these drawbacks confine the known additive manufacturing method to applications in which the manufactured plastic components only have to withstand a low mechanical load. These components can be e.g. simple everyday objects, such as toy figures or decorative articles. A further possible use is in the production of prototypes and/or sample components to obtain a visual impression of the component at an early stage in the development process of a product and/or to render possible a design adaptation to adjacent components.

However, the use of generative and/or adaptive manufacturing methods would also be economically useful in small-series production in which only a small number of pieces of certain components are required. But this currently often fails because of the low mechanical load-bearing capacity of the components produced with the known method.

Proceeding from the prior art, the object of the invention is therefore that of providing a manufacturing method by means of which plastic components with high mechanical load-bearing capacity and/or high surface quality can be provided.

The invention proposes a method and a device for additively manufacturing a component. An additive and/or generative manufacture within the meaning of the present invention is understood to mean a method in which a material is added to the component in the course of the manufacturing process. The adaptive manufacturing process thus differs from e.g. machining which starts with a large amount of material, some of which is removed during the processing method.

The thus produced component can be e.g. an article which is only required in small quantities or as a small series to thus avoid the production of a complex injection molding tool. In other embodiments of the invention, the component can be a prototype or a display model for getting a quick impression of the component in the development process.

The device according to the invention has at least one component holder which is designed to hold the component to be produced during the manufacturing process. The component holder can be or include e.g. a machine table, a chuck or another device known per se.

The device according to the invention also has an application device which is designed to heat a thermoplastic material and deposit it in a predeterminable amount at predeterminable locations. For this purpose, the application device is movable in relation to the component holder. Therefore, the component holder can be stationary and the application device can be slidable in at least three spatial directions and optionally be pivotably mounted in at least one direction. In other embodiments of the invention, a stationary application device can be combined with a component holder which is movable in at least three lateral spatial directions. In yet another embodiment, the application device can be movable in one or two spatial directions and the component holder can be movable in one or two spatial directions complementary thereto. A relative movement between the application device and the component holder is essential. The invention does not teach the use of a special machine kinematics as a solution principle.

The movability of the component holder and/or application device can be realized by e.g. spindle drives, pneumatic drives, piezo drives, industrial robots or other devices of automation technology that are known per se.

The application device is designed to heat a thermoplastic material and deposit it in a predeterminable amount and/or at a predeterminable discharge rate at predeterminable locations of the component. For this purpose, the thermoplastic material of the application device can be supplied e.g. as a strand, as a powder or as granules. In some embodiments of the invention, the thermoplastic material can be available in liquefied form in a storage container and be conveyed to the application device as a liquid or pasty mass.

The application device comprises at least one extruder nozzle, from which the heated thermoplastic material is provided. Finally, the application device comprises a control apparatus which controls the amount of delivered thermoplastic material, such that greater or smaller amounts can be provided per unit time or it is possible to fully stop the flow of material. When the device is operated, the component is built up layer by layer in a plurality of working planes in a manner known per se. For this purpose, production data is generated by means of a computer, said data including the appearance of the individual material layers in the respective working plane and being continuously outputted to the device according to the invention to deposit layer by layer for the component.

According to the invention, it now proposed that in one embodiment the device includes at least one radiation source which is designed to produce electromagnetic radiation by means of which at least a partial area of the component can be heated. This feature has the effect that the already deposited and solidified material of a preceding working plane can be heated again. As a result, the connection of the deposited thermoplastic material of the currently produced working plane to the material of the preceding working plane of the component can be improved when the thermoplastic material from the application device meets with a heated and/or molten material of the component. In this way, the homogeneity of the melt-layered material can be increased.

In some embodiments of the invention, the temperature gradient in the joining area can be less than about 5 K, less than about 3 K or less than about 1 K due to the electromagnetic radiation. The low temperature gradient in the joining area between the material from the application device and the component material deposited in preceding work steps effects compensation processes, such as self-diffusion, as a result of which the joining seam disappears at least in part and the material homogeneity of the component increases. As a consequence, the impact strength and ductility of the component can be increased, such that the components produced according to the invention can be used even if components known per se would mechanically fail.

In some embodiments of the invention, the device according to the invention can have at least one supply apparatus which is designed to introduce into the component a fiber reinforcement which includes or consists of an endless fiber. In this way, it is for the first time possible to also produce fiber-reinforced plastic materials having a large fiber volume fraction of more than 35% or more than 50% in a generative manufacturing process by means of the device according to the invention. Since the fibers, unlike in known devices, do not have to pass through the nozzle of the application device but are inserted into the component through a separate supply apparatus, higher fiber volume fractions can be realized. In some embodiments, this increases the mechanical loading capacity of the component, in particular with respect to tensile stresses, and therefore expands the possible uses of additively manufactured components.

In some embodiments of the invention, the fiber reinforcement in the form of strips can be processed, alternating with a non-fiber reinforced thermoplastic plastic material from the application device in a layer-by-layer fashion. Therefore, the fiber reinforcement which includes or consists of an endless fiber, is initially deposited in the next following working plane and then embedded in thermoplastic material from the application device.

In some embodiments of the invention, the device can have a tool change system which can hold both the application device and the supply apparatus. In this way, it is possible to alternately process reinforcement fibers and thermoplastic material to produce a fiber-reinforced component layer by layer.

In some embodiments of the invention, the device proposed according to the invention can have both a radiation source which is designed to produce electromagnetic radiation, by means of which at least one partial area of the component can be heated, and a supply apparatus which can introduce into the component a fiber reinforcement which includes or consists of an endless fiber. The combination of the two features permits the heating or melting of the component before the fiber reinforcement is deposited, such that the fiber reinforcement is already partially embedded in the component and is thus mechanically fixed and a homogeneous transition between fiber reinforcement and thermoplastic material is achieved. Alternatively or additionally, the fiber reinforcement itself and/or the underlying material of the component can also be heated before the fiber reinforcement is embedded in heated thermoplastic material from the application device. Due to low temperature gradients between fiber reinforcement, component and thermoplastic material from the application device, the above described compensation processes can again proceed which make at least part of the joining seam disappear and render possible a homogeneous connection of the thermoplastic materials and an incorporation of the fiber reinforcement which, if possible, extends over the entire area.

In some embodiments of the invention, the radiation source can include or consist of at least one laser. The laser can be designed to emit infrared radiation. In some embodiments of the invention, the laser can have an emission wavelength between about 15 $\mu$m and about 1 $\mu$m or between about 12 $\mu$m and about 8 $\mu$m. In some embodiments of the invention, the laser can be a CO2 laser which emits electromagnetic radiation having a wavelength of 10.6 $\mu$m.

The wavelength of the laser is adjusted to the plastic material of the component in so far as the electromagnetic radiation of the laser can be absorbed into the plastic material to heat it. For this purpose, the plastic material can include, in some embodiments of the invention, a dye which has at least one absorption band in the range of the laser radiation used. The dye can be transparent in the visible spectral range so as not to impair the visual appearance of the component. The superficial heating of the already processed plastic material of the component is conducted by the laser radiation. In some embodiments of the invention, the heating can be effected about 15 K to about 50 K or about 20 K to about 40 K above the melting temperature of the thermoplastic material used. In some embodiments of the invention, the component is heated in such a way that the temperature gradient between the material leaving the application device and the heated material of the component is at a minimum when the material is deposited.

In some embodiments of the invention, the radiation source can additionally include at least one movable mirror, by means of which the radiation can be directed to the partial area of the component to be heated. Movable mirrors here have a lower mass inertia than the laser light source used, such that the radiation can rapidly be directed to the desired location of the component by moving the mirrors, e.g. always ahead in relation to the movement of the nozzle of the application device.

In some embodiments of the invention, the heating above the melting temperature can start from the surface to a depth of about 0.01 mm to about 0.2 mm. In other embodiments of the invention, the heating above the melting temperature can start from the surface to a depth of about 0.05 mm to about 0.15 mm. As a result, a continuous temperature profile from the surface to the already deposited material of the component is rendered possible so as to reduce inhomogeneities of the component and increase the impact strength.

In some embodiments of the invention, the device can additionally have a press-on system. In some embodiments of the invention, the press-on system can have at least one roller, one ball, one pin or further components not specified herein. As a result, the fiber reinforcement can be embedded in the already deposited thermoplastic material to increase the fiber volume fraction of the finished component.

In some embodiments of the invention, the fiber reinforcement can include a pre-impregnated semi-finished textile product. In some embodiments of the invention, such a semi-finished textile product can have a fiber volume fraction of more than 40% or more than 60% or more than 80%.

In some of the embodiments of the invention, the impregnation of the pre-impregnated semi-finished textile product can include or consist of thermoplastic polymers, wherein the reinforcement fibers are embedded in fully or partially impregnated fashion. The thermoplastic polymers can be melted by introducing heat, e.g. by electromagnetic radiation, such that the fiber reinforcement can be flexibly introduced into the component. The solidification of the two layers, and thus the connection process, takes place by when the fiber reinforcement and the thermoplastic material underneath cool. This process can also be made under pressure which can be applied e.g. by a press-on system. After the completion of a component and the full solidification of the thermoplastic polymer, the fiber reinforcement achieves its final strength, such that the component itself can have a strength that is higher than that of known generatively produced components.

In some embodiments of the invention, this invention relates to a method for additively manufacturing a component, in which at least one surface of the component is heated above the melting temperature by the influence of electromagnetic radiation. In some embodiments of the invention, the heating can be carried out about 15 K to about 30 K above the melting temperature. As a result, the surface of the finished product can be smoothed and the component can thus be refined. In some embodiments of the invention, the melting depth can be selected in such a way that it is approximately equal to the maximum roughness depth. In some embodiments of the invention, the melting depth can be less than the maximum roughness depth. This results in a remelting process which causes the smoothing of the rough locations due to surface tensions. Therefore, it is possible to also produce components which were made by individual strands or dots from thermoplastic material and thus have a poor surface quality, with roughness depths of about 0.4 µm to about 3 µm. This expands the possible uses of the generative manufacturing process since both technically sophisticated surfaces, such as sliding bearings, can be produced and decorative surfaces can be provided.

The invention shall be explained in more detail below by means of drawings without limiting the general inventive concept, wherein FIG. 1 shows a device according to the present invention when the thermoplastic material is deposited.

Figure 2:
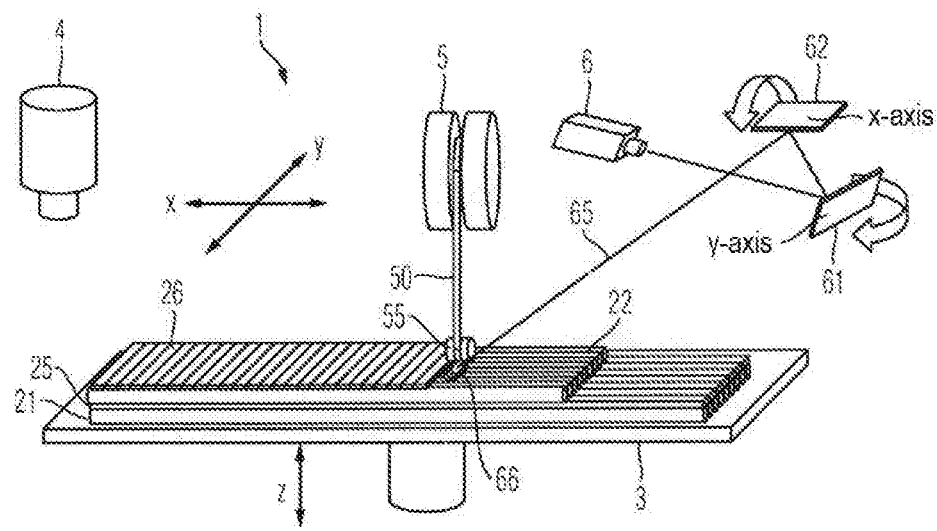
FIG. 2 shows the device according to FIG. 1 when a fiber reinforcement is deposited.

FIG. 2 shows the device according to FIG. 1 when a fiber reinforcement is deposited.

Figure 3:
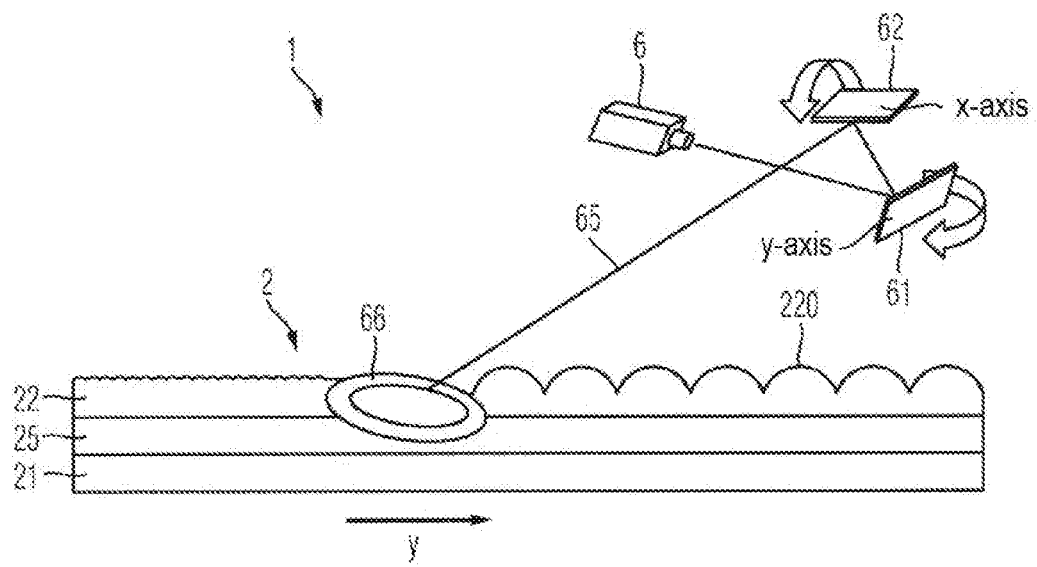
FIG. 3 shows the surface smoothing of a fiber-reinforced component.

FIG. 3 shows the surface smoothing of a fiber-reinforced component.

Figure 4:
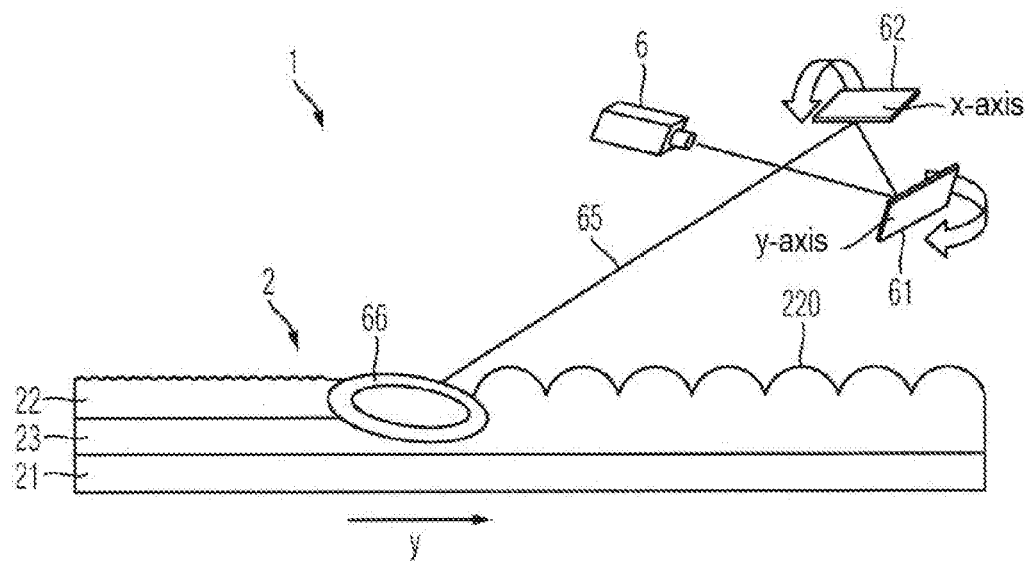
FIG. 4 shows the surface smoothing of a component without fiber reinforcement.

FIG. 4 shows the surface smoothing of a component without fiber reinforcement.

Figure 5:
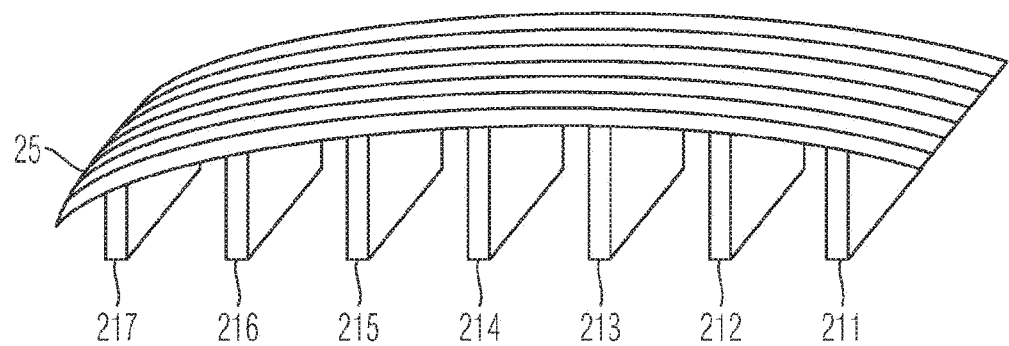
FIG. 5 shows a first embodiment of a component produced according to the invention.

FIG. 5 shows a first embodiment of a component produced according to the invention.

Figure 6:
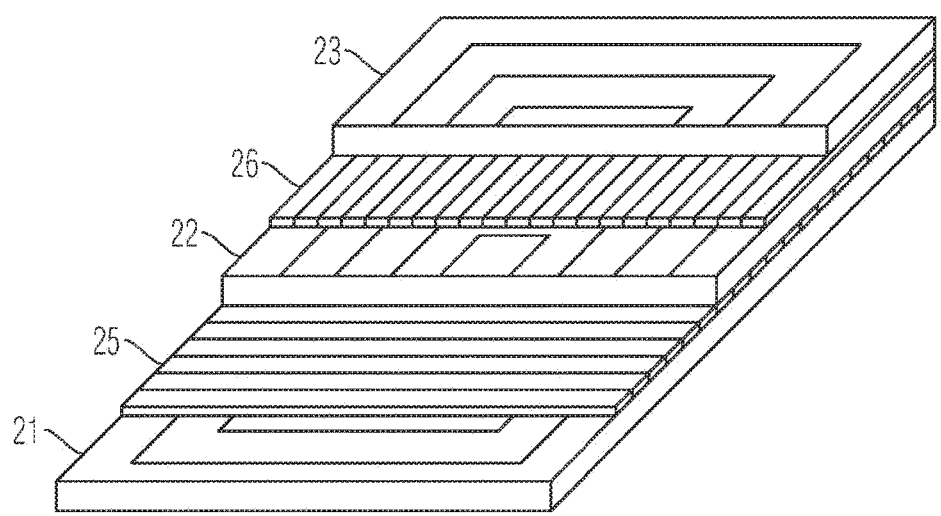
FIG. 6 shows a second embodiment of a component produced according to the invention.

FIG. 6 shows a second embodiment of a component produced according to the invention.

FIG. 1 shows an embodiment of a device according to the invention for additively manufacturing a component 2. The component 2 is held in a component holder 3, which in the illustrated embodiment can be moved up and down. The component holder 3 includes a supporting table, on which the component 2 is mounted, e.g. by an adhesive connection or a clamping connection.

Component 2, which is shown by way of example, includes a first layer 21 made of a thermoplastic material, a layer 25 of reinforcement fibers and a second layer 22, which is made of a thermoplastic material and is deposited on the layer of reinforcement fibers. FIG. 1 shows the device during the deposition of the second layer 22 of thermoplastic material.

In order to produce the component 2 layer by layer, the component holder 3 can be lowered by a predeterminable amount in the z direction after the production of a first layer in order to deposit the second layer on the first layer. Having deposited the second layer, the component holder can again be lowered by a predeterminable amount in order to produce the third layer. This procedure is continued until the component 2 has been completed.

In order to provide predeterminable surface areas within a working plane with thermoplastic material and/or reinforcement fibers, the application device 4 is movable in the working plane of the component holder 3. In the drawings, this plane is designated by the spatial directions x and y.

The application device 4 is provided with thermoplastic material and/or semi-finished product as a wire, strand, powder or in a preheated, pasty form. The thermoplastic material is melted in the application device 4 and discharged at a predeterminable discharge rate as a beam 29. The beam can be intensified or weakened or be completely stopped in order to deposit individual strands or dots of thermoplastic material on the component 2.

The device 1 also has a radiation source 6. In the illustrated embodiment, the radiation source 6 is designed as a laser which emits coherent, high-energy radiation. In some embodiments of the invention, this radiation can comprise the infrared spectral range. For example, the laser radiation can have a wavelength of 10.6 µm.

The radiation 65 of the laser is deflected by means of two movable mirrors 61 and 62 so as to pivot the beam spot 6 on the surface of the component 2.

In order to produce a fiber-reinforced component 2 having properties improved with respect to the prior art, the beam spot 66 is either guided always ahead with respect to the beam 29 of the thermoplastic material across the surface of the component 2 or the beam spot 66 strikes in the region of the impact point of the beam 29 of the thermoplastic material. As a result, the already deposited first layer 21 of thermoplastic material and/or the fiber reinforcement 25 is heated. As a consequence, the heated thermoplastic material bonds to the thermoplastic material 29 from the application device 4 in an almost seam-free manner. Therefore, the fiber reinforcement 25 can be embedded in the thermoplastic material of the component 2 and/or the component 2 has an increased impact strength and/or ductility even without a fiber reinforcement on account of the better connection of the deposited material with the already available material.

FIG. 1 additionally shows a supply apparatus 5, which provides a fiber reinforcement 50. The supply apparatus 5 can be coupled e.g. by means of a quick-change system to the positioning apparatus (not shown) of the device 1 when the application device 4 is not required and otherwise be stored temporarily in a tool magazine.

FIG. 2 shows the device 1 according to FIG. 1 during the production of a fiber reinforcement in the component 2. The same reference signs designate the same parts of the invention, and therefore the following description is limited to the essential differences.

According to FIG. 2, the second layer of thermoplastic material 22 was completed. A second fiber reinforcement 26 is now produced thereon.

For this purpose, the application device 4 is supplied to a tool magazine and the supply apparatus 5 is connected to the positioning apparatus. Then, the reinforcement fiber 50, which includes or consists of an endless fiber, is unwound from a supply reel of the supply apparatus 5 and deposited on the surface of the second thermoplastic layer 22 by means of a pressure roller 55.

The beam spot 66 of the beam source 6 moves constantly ahead of the pressure roller 55. It causes an at least superficial partial melting of the second thermoplastic layer 22, such that the reinforcement fiber 50 can be introduced, at least in part, into the thermoplastic material by the pressure roller 55.

The reinforcement fiber 50 can include a pre-impregnated semi-finished textile product. In some embodiments of the invention, such a semi-finished textile product can include a fiber volume fraction of more than 40% or more than 60% or more than 80%.

In some embodiments of the invention, the impregnation of the pre-impregnated semi-finished textile product can include or consist of thermoplastic polymers, wherein the reinforcement fibers 50 are embedded in fully or partially impregnated form. Heat can be introduced by the beam spot 66 of the radiation source 6 that constantly moves ahead. As a result of said heat, the thermoplastic polymers of the impregnation of the reinforcement fibers can be melted, and therefore the fiber reinforcement can be inserted into the component in a flexible way. Due to the cooling of the fiber reinforcement and the thermoplastic material underneath, the solidification of the two layers and thus the connection process take place. This connection process can also take place under the pressure of the pressure roller 55.

The smoothing of the surface 220 of a component 2 is explained by means of FIGS. 3 and 4.

As is shown in FIGS. 1 and 2, the thermoplastic material is deposited in strands on the surface of the component 2. This leads to a ribbed or corrugated surface, the roughness depth of which is given by the diameter of the deposited strands of thermoplastic material. As a result, the components 2 can have a roughness depth of more than 100 μm, more than 150 μm or even more than 200 μm. This surface quality is insufficient for many applications.

The invention now proposes to direct the beam spot 66 onto the surface in such a way that it melts. In some embodiments of the invention, the surface 220 can be heated by about 20 K above the melting temperature.

As a result of the temporary, local liquefaction of the surface 220, the roughness is leveled due to the local viscosity decrease and the surface tension of the thermoplastic material. Therefore, the surface is smoothed in a manner similar to the laser polishing of glasses or metals. In some embodiments of the invention, the surface roughness and/or the roughness depth after smoothing can be between about 0.4 μm and about 3 μm. This expands the application range of the generative manufacturing process for components which must meet high decorative requirements and/or should have precise fits.

FIG. 5 shows by way of example a component which can be produced by the manufacturing process proposed according to the invention and the device according to the invention. The component 2 according to FIG. 5 has a fiber-reinforced cover layer 25, which due to high filling degrees has a high strength. Approximately orthogonally arranged inner supporting structures of non-reinforced thermoplastic can be provided for the purposes of load transfer. Seven support structures 211, 212, 213, 214, 215, 216 and 217 are shown by way of example in FIG. 5. In other embodiments, the number can be larger or smaller. The illustrated embodiment merely explains the design principle of the component by way of example. The supporting structures can be calculated as bionic structures to render possible a maximum strength at the locations of maximum load.

For example, high-strength and yet light-weight structures can be produced by means of the component structure shown e.g. in FIG. 5.

FIG. 6 shows a second embodiment of a component according to the present invention. The component according to the second embodiment includes five layers, wherein two layers 25 and 26 include a fiber reinforcement which are embedded in three layers 21, 22 and 23 of thermoplastic material. Due to the melting of the respectively preceding layer during the deposition of the next layer, a good embedding of the fiber reinforcement and a good connection of the layers deposited on top of one another is achieved such that a component with improved notched impact strength is obtained by homogenized material transition and high strength by loading condition-specific integration of endless reinforcement fibers.

Of course, the invention is not limited to the illustrated embodiments. Therefore, the above description should not be considered limiting but explanatory. The below claims should be understood such that a stated feature is present in at least one embodiment of the invention. This does not rule out the presence of further features. If the claims and the above description define "first" and "second" embodiments, this designation serves to distinguish between two similar embodiments without determining an order.

The invention claimed is:

1. A method for additively manufacturing a component, said method comprising:
   depositing a heated thermoplastic material in at least one predefined surface area of the component; and
   solidifying said thermoplastic material by cooling, wherein at least one fiber reinforcement is inserted into the component by means of at least one supply apparatus, said fiber reinforcement comprising at least one pre-impregnated semi-finished textile product, wherein the fiber reinforcement is pre-impregnated with a thermoplastic material,
   wherein said pre-impregnated semi-finished textile product comprises a fiber volume fraction of more than about 35% or more than about 40% or more than about 60%.

2. The method according to claim 1, wherein at least the predefined surface area of the component is heated above the melting point before the thermoplastic material is deposited.

3. The method according to claim 2, wherein said predefined surface area of the component is heated 15 K to 70 K above the melting point.

4. The method according to claim 2, wherein said predefined surface area of the component is heated 20 K to 40 K above the melting point.

5. The method according to claim 2, wherein said predefined surface area of the component is heated to a depth of about 0.01 mm to about 0.2 mm from the surface.

6. The method according to claim 2, wherein said predefined surface area of the component is heated to a depth of about 0.05 mm to about 0.15 mm from the surface.

7. The method according to claim 2, wherein heating is done by directing electromagnetic radiation onto said predefined surface area, said radiation having a wavelength being matched to at least one absorption band of said thermoplastic material.

8. The method according to claim 1, wherein said fiber reinforcement comprises any of glass fibers, carbon fibers, and aramid fibers.

9. The method according to claim 1, wherein said pre-impregnated semi-finished textile product is impregnated with at least one thermoplastic polymer.

10. The method according to claim 1, wherein the fiber reinforcement is heated prior to inserting it into the component.

11. The method according to claim 1, wherein the fiber reinforcement is embedded into said component by means of at least one press-on system.

12. A method for additively manufacturing a component, said method comprising:
    depositing a heated thermoplastic material in at least one predefined surface area of the component; and
    solidifying said thermoplastic material by cooling,
    wherein at least one fiber reinforcement is inserted into the component by means of at least one supply apparatus, said fiber reinforcement comprising at least one pre-impregnated semi-finished textile product, wherein the fiber reinforcement is pre-impregnated with a thermoplastic material, wherein said pre-impregnated semi-finished textile product comprises a fiber volume fraction of more than about 35% or more than about 40% or more than about 60%.

13. The method according to claim 12, wherein said fiber reinforcement comprises any of glass fibers, carbon fibers, and aramid fibers.

14. The method according to claim 12, wherein said pre-impregnated semi-finished textile product is impregnated with at least one thermoplastic polymer.

15. The method according to claim 12, wherein the fiber reinforcement is heated prior to inserting the fiber reinforcement into the component.

16. The method according to claim 12, wherein the fiber reinforcement is embedded into said component by means of at least one press-on system.

* * * * *